United States Patent [19]

Yukawa

[11] 4,366,280

[45] Dec. 28, 1982

[54] ORGANIC POLYMERIC MATERIALS STABILIZED WITH ACYLATED HYDROXY ACID TYPE COMPOUNDS

[75] Inventor: Muneaki Yukawa, Tokyo, Japan

[73] Assignees: K.K. Musashino Kagaku Kenkyusho, Tokyo, Japan; Ciba-Geigy AG, Basel, Switzerland

[21] Appl. No.: 203,362

[22] Filed: Nov. 3, 1980

[30] Foreign Application Priority Data

Nov. 2, 1979 [JP] Japan .................................. 54-141172
Apr. 3, 1980 [JP] Japan .................................. 55-042755

[51] Int. Cl.$^3$ .............................................. C08K 5/11
[52] U.S. Cl. .................................. 524/291; 524/304; 524/342; 524/397
[58] Field of Search ................. 260/31.2 MR, 31.2 N, 260/31.2 XA, 31.2 R, 45.85 R, 45.75 B, 45.75 V, 45.75 T, 45.75 R, 23 H, 23 XA, 22 A, 23.7 M, 18 TN, 18 R, 45.75 F, 410.6, 410.9 R; 524/397

[56] References Cited

U.S. PATENT DOCUMENTS

| | | | |
|---|---|---|---|
| 2,510,035 | 5/1950 | Mack .............................. | 260/45.85 R |
| 2,590,852 | 4/1952 | Fein ................................ | 260/410.6 |
| 2,595,636 | 5/1952 | Brighton et al. ............. | 260/45.85 R |
| 2,733,252 | 1/1956 | Thompson et al. ......... | 260/410.6 UX |
| 2,782,176 | 12/1957 | Darby et al. ................. | 260/45.85 R |
| 2,789,992 | 4/1957 | Thompson et al. ......... | 260/410.6 UX |
| 2,864,703 | 12/1958 | Schulman ...................... | 260/410.6 |

FOREIGN PATENT DOCUMENTS

51-1262 1/1976 Japan .
1119010 7/1968 United Kingdom .

Primary Examiner—V. P. Hoke
Attorney, Agent, or Firm—Wenderoth, Lind & Ponack

[57] ABSTRACT

Organic polymers selected from the group consisting of
polyolefins
unsaturated elastomers
copolymers of monoolefines and diolefines with other vinyl monomers
polystyrene and copolymers thereof
polymers which are derived from $\alpha,\beta$-unsaturated acids and derivatives thereof and copolymers of these monomers with other unsaturated monomers
polymers derived from unsaturated alcohols and amines or derivatives thereof
polyacetals
polyamides and copolyamides
are stabilized against thermooxidative deterioration by the addition of acylated hydroxy acid type compounds of the formula (I)

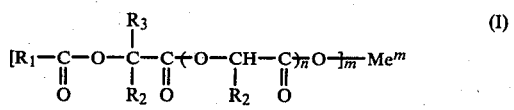

Wherein the meanings of the substituents and symbols in formula (I) are as defined herein.

5 Claims, No Drawings

ORGANIC POLYMERIC MATERIALS STABILIZED WITH ACYLATED HYDROXY ACID TYPE COMPOUNDS

The present invention relates to the use of acylated hydroxy acid type compounds for stabilizing organic polymeric materials against thermooxidative deterioration, and to the organic polymers stabilized with the said compounds.

In Japanese Patent Publication No. 47-9261 a combination of calcium stearate or calcium laurate, BHT and IRGANOX 1010 is said to be particularly effective for the stabilization of organic polymeric materials. This stabilization, however, entails some shortcomings in the aspect of practical use and coloring is seen under practical conditions.

It has now been found that surprisingly a particularly high degree of stabilizing effectiveness against thermooxidative deterioration is obtained by incorporating in one of the organic polymers selected from the group consisting of polyolefins
unsaturated elastomers
copolymers of monoolefines and diolefines with other vinyl monomers
polystyrene and copolymers thereof
polymers which are derived from $\alpha,\beta$-unsaturated acids and derivatives thereof and copolymers of these monomers with other unsaturated monomers
polymers derived from unsaturated alcohols and amines or derivatives thereof
polyacetals
polyamides and copolyamides a compound of the general formula (I)

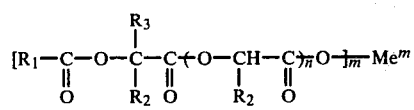

in which $R_1$ is hydrogen, $C_1$–$C_{23}$ alkyl unsubstituted or substituted by 1 to 5 hydroxy groups or $C_2$–$C_{23}$ alkenyl, $R_2$ is hydrogen, methyl or phenyl, $R_3$ is hydrogen or methyl, n is 0–4, Me is Group I metal, Group II metal, Group III metal, zinc, cadmium, tin, lead, titanium, antimony, bismuth or vanadium and m is the valence of the metal, preferably in combination with phenolic antioxidants.

Preferred compositions of the present invention comprise one of the polymers as identified above and, as a stabilizer, a mixture containing at least one member of the following compounds (b)–(f) as defined below together with the compound (a) of the general formula (I):

(b) Free acids of the formula (I) in which Me is hydrogen, m is 1, $R_1$, $R_2$, $R_3$ and n are as defined above.

(c) Free acids not being acylated of the general formula (I) in which Me is hydrogen, m is 1, $R_1$—CO— is hydrogen, $R_2$, $R_3$ and n are as defined above.

(d) Metal salts of (c) with metal Me as defined above.

(e) Free acids of the formula $R_1$-COOH wherein $R_1$ is as defined above.

(f) Metal salts of (e) with metal Me as defined above.

This desirable stabilizer mixture comprises at least 50% by weight of (a), the remainder being (b), (c), (d), (e) and/or (f).

In the definitions of the symbols of formula I $R_1$ is $C_1$–$C_{23}$ branched or unbranched alkyl, especially $C_7$–$C_{23}$alkyl, like methyl, ethyl, propyl, heptyl, undecyl, tridecyl, pentadecyl, heptadecyl, 2-ethyl-heptyl, 2-hexyl-nonyl or the like, and $R_1$CO therefore stands especially for a fatty acid acyl residue of 8–24 carbon atoms, above all for stearoyl. If $R_1$ is substituted by 1 to 5 hydroxy groups, such residues contain especially as many carbon atoms as hydroxy groups, each carbon atom carrying one hydroxy group, or hydroxyalkyl is of 2 to 18 carbon atoms, carrying one hydroxyl group especially in 1-position, like 1-hydroxyethyl, 1-hydroxy-propyl or 1-hydroxy-heptyl. An example of monohydroxyalkyl carrying the hydroxyl group in another position than 1 is 11-hydroxyheptadecyl. $R_1$ as $C_2$–$C_{23}$alkenyl contains several, especially two and most preferred one double bond, and has preferably 2 to 17 carbon atoms, like vinyl, allyl, heptenyl or hexadecenyl.

Those metals which are defined as preferred are sodium, potassium, lithium, calcium, magnesium, barium, aluminium, cadmium and zinc and of these it is magnesium, zinc and particularly calcium that are preferred. Mixed salts, such as barium/calcium, are also possible.

$R_2$ is preferably methyl i.e. compounds derived from lactic acid and condensed lactic acid and $R_3$ is preferably H.

Thus, the preferred compound of the general formula (I) is calcium stearoyl lactate.

By the calcium stearoyl lactate is meant the calcium salt of the stearate ester of condensed lactic acid. In the Japanese list of chemical substances [7-2115] it is expressed as salt (calcium) of the condensate of the lactic acid polycondensate (with the polymerization degree of 1–5) and the saturated fatty acid ($C_8$–$C_{22}$) and listed together with sodium salt and potassium salt. In the Japanese Official Compendia for Food Additives, Edition IV, in section "Calcium Stearoyl Lactylate" it is expressed as white to yellowish white powdered or flaked solids with acid value of 50–86 and ester value of 125–164, comprising calcium salts of stearoyl lactates as the main component and their related acids and their calcium salts. To show one example by structural formula, it is

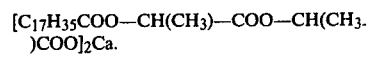

Calcium stearoyl lactate and sodium stearoyl lactate have heretofore been used, as food additives, in flour doughiness improving agents, foaming agents and so forth at the time of making bread.

The compounds of the general formula (I) can be used in a pure form (a) or preferably in a form of an unpurified reaction mixture not stripped of by-products (b) to (f) on the occasion of preparing the compounds of the formula (I). There can also be used mixtures of different compounds represented by the general formula (I) containing or stripped of the similar by-products. The amount of the compounds of the general formula (I) used on this occasion with regard to the organic polymers should be 0.05–2% by weight as (a) or 0.05–3% by weight as reaction mixture and preferably 0.05–0.5% by weight as (a).

Stabilizers used in the present invention are known as chemical synthetic substances. Part of these substances, however, will be novel substances. These compounds of the general formula (I) can be synthesized by the known, procedure as follows.

As mentioned in the U.S. Pat. No. 2,744,825, acid chloride $R_1COCl$, such as stearoyl chloride, is mixed with acid (c) $HO—C(R_2)(R_3)—CO-(O—CH—R—CO)_{\overline{n}}OH$, such as preconcentrated lactic acid, or its lower alkyl ester, esterified preferably under reduced pressure with the application of heat (70°–200° C., for instance), then dissolved in ethanol, for instance, and neutralized with metal carbonate, such as calcium carbonate, bicarbonate oxide and so forth.

For another method, as mentioned in the U.S. Pat. Nos. 2,733,252 or 4,146,548, acid (e) $R_1COOH$, such as stearic acid, is mixed to the said acid (c), such as preconcentrated lactic acid, metal carbonate, such as calcium carbonate, or hydroxide, then heated (at 130°–200° C., for instance) and reacted preferably under an inert gas or under reduced pressure.

It is obvious from these methods that the product should contain, besides the compound (a) of the general formula (I), some degree of (b), (c), (d), (e) and (f) as defined above. Such a mixture sufficiently meets the purpose of the present invention. It is also clear in terms of these synthetic methods that the compounds of (b)–(f) could be defined as the above. The compound of the general formula (I) should preferably be contained in the amount of at least 50% of the weight of the mixture.

In the present invention such organic polymer compositions are preferred which contain a sterically hindered phenolic compound together with the compounds of the general formula (I). The following are examples of such phenols:

1.1. Alkylated monophenols, for example,
   2,6-di-tert.butyl-4-methylphenol
   2-tert.butyl-4,6-dimethylphenol
   2,6-di-tert.butyl-4-ethylphenol
   2,6-di-tert.butyl-4-n-butylphenol
   2,6-di-tert.butyl-4-i-butylphenol
   2,6-di-cyclopentyl-4-methylphenol
   2-(α-methylcyclohexyl)-4,6-dimethylphenol
   2,6-di-octadecyl-4-methylphenol
   2,4,6-tri-cyclohexylphenol
   2,6-di-tert.butyl-4-methoxymethylphenol
1.2. Alkylated hydroquinones, for example,
   2,6-di-tert.butyl-4-methoxyphenol
   2,5-di-tert.butyl-hydroquinone
   2,5-di-tert.amyl-hydroquinone
1.3. Hydroxylate thiodiphenyl ethers, for example
   2,2'-thio-bis-(6-tert.butyl-4-methylphenol)
   2,2'-thio-bis-(4-octylphenol)
   4,4'-thio-bis-(6-tert.butyl-3-methylphenol)
   4,4'-thio-bis-(6-tert.butyl-2-methylphenol)
1.4. Alkylidene-bishpenols, for example,
   2,2'-methylen-bis-(6-tert.butyl-4-methylphenyl)
   2,2'-methylen-bis-(6-tert.butyl-4-ethylphenol)
   2,2'-methylen-bis-[4-methyl-6-(α-methylcyclohexyl)-phenol]
   2,2'-methylen-bis-(4-methyl-6-cyclohexylphenol)
   2,2'-methylen-bis-(6-nonyl-4-methylphenol)
   2,2'-methylen-bis-(4,6-di-tert.butylphenol)
   2,2'-ethyliden-bis-(4,6-di-tert.butylphenol)
   2,2'-ethyliden-bis-(6-tert.butyl-4-isobutylphenol)
   4,4'-methylen-bis-(2,6-di-tert.butylphenol)
   4,4'-methylen-bis-(6-tert.butyl-2-methylphenol)
   1,1-bis-(5-tert.butyl-4-hydroxy-2-methylphenyl)-butane
   2,6-di-(3-tert.butyl-5-methyl-2-hydroxybenzyl)-4-methylphenol
   1,1,3-tris-(5-tert.butyl-4-hydroxy-2-methylphenyl)-butane
   1,1-bis-(5-tert.butyl-4-hydroxy-2-methylphenyl)-3-n-dodecylmercaptobutane
   ethylenglycol-bis-[3,3-bis-(3'-tert.butyl-4'-hydroxyphenyl)-butyrat]
   di-(3-tert.butyl-4-hydroxy-5-methylphenyl)-dicyclopentadien
   di-[2-(3'-tert.butyl-2'-hydroxy-5'-methyl-benzyl)-6-tert.butyl-4-methylphenyl]-terephthalate.
1.5 Benzylcompounds, for example,
   1,3,5-tri-(3,5-di-tert.butyl-4-hydroxybenzyl)-2,4,6-trimethylbenzol
   di-(3,5-di-tert.butyl-4-hydroxybenzyl)-sulfide
   3,5-di-tert.butyl-4-hydroxybenzyl-mercapto-acetic acid-isooctyl ester
   bis-(4-tert.butyl-3-hydroxy-2,6-dimethylbenzyl)dithiol-terephthalate
   1,3,5-tris-(3,5-di-tert.butyl-4-hydroxybenzyl)-isocyanurate
   1,3,5-tris-(4-tert.butyl-3-hydroxy-2,6-dimethylbenzyl)-isocyanurate
   3,5-di-tert.butyl-4-hydroxybenzyl-phosphoric acid-dioctadecyl ester
   3,5-di-tert.butyl-4-hydroxybenzyl-phosphoric acid-monoethyl ester, calcium-salt
1.6. Acylaminophenols, for example,
   4-hydroxy-lauric acid anilide
   4-hydroxy-stearic acid anilide
   2,4-bis-octylmercapto-6-(3,5-di-tert.butyl-4-hydroxyanilino)-s-triazine
1.7. Esters of β-(3,5-di-tert.butyl-4-hydroxyphenyl)-propionic acid with monohydric or polyhydric alcohols, for example,
   methanol
   diethylenglycol
   octadecanol
   1,6-hexandiol
   neopentylglycol
   thiodiethylenglycol
   triethylenglycol
   pentaerytrite
   tris-hydroxyethyl isocyanurate
   di-hydroxyethyl oxalic acid diamide
1.8. Esters of β(5-tert.butyl-4-hydroxy-3-methylphenyl)propionic acid with monohydric or polyhydric alcohols, for example,
   methanol
   octadecanol
   1,6-hexandiol
   neopentylglycol
   thiodiethylenglycol
   diethylenglycol
   triethylenglycol
   pentaerytrite
   tris-hydroxyethyl isocyanurate
   di-hydroxyethyl oxalic acid diamide
1.9. Amides of β-(3,5-di-tert.butyl-4-hydroxyphenyl)-propionic acid, for example,
   N,N'-di-(3,5-di-tert.butyl-4-hydroxyphenylpropionyl)-hexamethylendiamine
   N,N'-di-(3,5-di-tert.butyl-4-hydroxyphenylpropionyl)-trimethylendiamine
   N,N'-di-(3,5-di-tert.butyl-4-hydroxyphenylpropionyl)-hydrazine.

Preferred phenolic compounds are 1,3,5-trimethyl-2,4,6-tris-(3,5-di-tert.butyl-4-hydroxybenzyl)benzene, stearyl-3-(3,5-di-tert.butyl-4-hydroxyphenyl)propionate, 2,2-thio-[diethyl-bis-3-(3,5-di-tert.butyl-4-hydroxyphenyl)-propionate], 2,6-di-tert.butyl-4-methylphenol and particularly preferably Pentaerythrityl-tetrakis-[3-(3,5-di-tert.butyl-4-hydroxyphenyl)propionate].

The amount of these sterically hindered phenolic compounds added is 0.001–1% by weight and 0.01–0.5% by weight, in particular, with regard to the organic polymers.

Sterically hindered phenolic compounds may be combined with each other. The compositions of the present invention may further comprise additional additives, such as, for example:

1. UV absorbers and light stabilisers 1.1. 2-(2'-Hydroxyphenyl)-benztriazoles, for example, the 5'-methyl-, 3',5'-di-tert.butyl-, 5'-tert.butyl-, 5'-(1,1,3,3-tetramethylbutyl)-, 5-chloro-3',5'-di-tert.butyl-, 5-chloro-3'-tert.butyl-5'-methyl-, 3'-sec.butyl-5'-tert.butyl-, 4'-octoxy-, 3',5'-di-tert.amylderivative.

1.2. 2-Hydroxy-benzophenones, for example, the 4-hydroxy-, 4-methoxy-, 4-octoxy, 4-decyloxy-, 4-dodecyloxy-, 4-benzyloxy, 4,2',4'-trihydroxy- and 2'-hydroxy-4,4'-dimethoxyderivative.

1.3. Esters of optionally substituted benzoic acids for example, phenyl salicylate, 4-tert.butyl-phenylsalicilate, octylphenyl salicylate, dibenzoylresorcinol, bis-(4-tert.butylbenzoyl)-resorcinol, benzoylresorcinol and 3,5-di-tert.-butyl-4-hydroxybenzoic acid 2,4-di-tert.butyl-phenyl ester.

1.4. Acrylates, for example, α-cyano-β,β-diphenylacrylic acid ethyl ester or isooctyl ester, α-carbomethoxy-cinnamic acid methyl ester, α-cyano-β-methyl-p-methoxy-cinnamic acid methyl ester or butyl ester, α-carbonmethoxy-p-methoxy-cinnamic acid methyl ester, N-(β-carbomethoxy-β-cyanovinyl)-2-methyl-indoline.

1.5. Nickel compounds, for example, nickel complexes of 2,2'-thio-bis-[4-(1,1,3,3-tetramethylbutyl)-phenol], such as the 1:1 or 1:2 complex, optionally with additional ligands such as n-butylamine, triethanolamine or N-cyclohexyl-di-ethanolamine, nickel dibutyldithiocarbamate, nickel salts of 4-hydroxy-3,5-di-tert.butylbenzyl-phosphonic acid monoalkyl esters, such as of the methyl, ethyl or butyl ester, nickel complexes of ketoximes such as of 2-hydroxy-4-methyl-phenyl undecyl ketonoxime, nickel complexes of 1-phenyl-4-lauroyl-5-hydroxy-pyrazol, optionally with additional ligands.

1.6. Sterically hindered amines, for example bis-(2,2,6,6-tetramethylpiperidyl)-sebacate, bis-(1,2,2,6,6-pentamethylpiperidyl)-sebacate, n-butyl-3,5-di-tert.butyl-4-hydroxybenzyl malonic acid bis-(1,2,2,6,6-pentamethylpiperidyl)ester, condensation product of 1-hydroxyethyl-2,2,6,6-tetramethyl-4-hydroxypiperidine and succinic acid, condensation product of N,N'-(2,2,6,6-tetramethylpiperidyl)-hexamethylenediamine and 4-tert.octylamino-2,6-dichloro-1,3,5-s-triazine, tris-(2,2,6,6-tetramethylpiperidyl)-nitrilotriacetate.

1.7. Oxalic acid diamides, for example, 4,4'-dioctyloxy-oxanilide, 2,2'-di-octyloxy-5,5'-di-tert.butyl-oxanilide, 2,2'-di-dodecyloxy-5,5'-di-tert.butyl-oxanilide, 2-ethoxy-2'-ethyl-oxanilide, N,N'-bis-(3-dimethylaminopropyl)-oxalamide, 2-ethoxy-5-tert.butyl-2'-ethyl-oxanilide and its mixture with 2-ethoxy-2'-ethyl-5,4'-di-tert.butyl-oxanilide and mixtures of ortho- and para-methoxy- as well as of o- and p-ethoxy-disubstituted oxanilides.

2. Metal deactivators, for example, N,N'-diphenyloxalic acid diamide, N-salicylal-N'-salicyloylhydrazine, N,N'-bis-salicyloylhydrazine, N,N'-bis-(3,5-di-tert.butyl-4-hydroxyphenylpropionyl)-hydrazine, 3-salicyloylamino-1,2,4-triazole, bis-benzyliden-oxalic acid dihydrazide.

3. Phosphites and phosphonites, for example, triphenyl phosphite, diphenylalkyl phosphites, phenyldialkyl phosphites, tri-(nonylphenyl) phosphite, trilauryl phosphite, trioctadecyl phosphite, di-stearyl-pentaerythrit diphosphite, tris-(2,4-di-tert.butylphenyl)-phosphite, di-isodecylpentaerythrit diphosphite, di-(2,4-di-tert.butyl-phenyl)pentaerythrit diphosphite, tristearyl-sorbite triphosphite, tetrakis-(2,4-di-tert.butylphenyl)-4,4'-biphenylylen diphosphonite.

4. Compounds which destroy peroxide, for example, esters of β-thiodipropionic acid, for example the lauryl, stearyl, myristyl or tridecyl esters, mercapto-benzimidazole or the zinc salt of 2-mercaptolbenzimidazole, zinc-dibutyl-dithiocarbamate, dioctadecyl-disulfide, pentaerythrit-tetrakis-(β-dodecylmercapto)-propionate.

5. Polyamide stabilisers, for example, copper salts in combination with iodides and/or phosphorus compounds and salts of divalent manganese.

6. Basic co-stabilisers, for example, melamine, polyvinylpyrrolidone, dicyandiamide, triallyl cyanurate, urea derivatives, hydrazine derivatives, amines, polyamides, polyurethanes, alkali metal salts and alkaline earth metal salts of higher fatty acids for example Ca stearate, Zn stearate, Mg stearate, Na ricinoleate and K palmitate, antimony pyrocatecholate or zinc pyrocatecholate.

7. Nucleating agents, for example, 4-tert.butyl-benzoic acid, adipic acid, diphenylacetic acid.

8. Fillers and reinforcing agents, for example, calcium carbonate, silicates, glass fibres, asbestos, talc, kaolin, mica, barium sulfate, metal oxides and hydroxydes, carbon black, graphite.

9. Other additives, for example, plasticisers, lubricants, emulsifiers, pigments, optical brighteners, flameproofing agents, antistatic agents and blowing agents.

The amount of additional additives used is 0.001–1% by weight with regard to the organic polymers.

The mentioned additives may be combined with each other, both within a specific group, e.g. two different light stabilizers, or as combinations between the individual groups.

In the present invention, stabilizers or stabilizer mixtures are suitable for stabilizing the following organic polymers:

1. Polyolefins such as 1.1. polymers that are derived from α-mono olefins, such as polyethylene of low and high density, which can optionally be cross-linked, polypropylene, polyisobutylene, polybutene-1 and polymethylpentene-1;

1.2. mixtures of the homopolymers mentioned under 1.1, such as mixtures of polypropylene and polyethylene, polypropylene and polybutene-1, polypropylene and polyisobutylene;

1.3. copolymers of the monomers on which the homopolymers mentioned under 1.1 are based, such as ethylene/propylene copolymers, propylene/butene-1 copolymers, propylene/isobutylene copolymers, ethylene/butene-1 copolymers, as well as terpolymers of ethylene and propylene with a diene, such as hexadiene, di-cyclopentadiene or ethylidene-norbornene.

2. Unsaturated elastomers, such as polymers of cycloolefines and diolefines, for instance, polyisoprene or polybutadiene, polycyclopentene or polynorbornene.

3. Copolymers of monoolefines and diolefines with other vinyl monomers, such as, for instance, ethylene-/alkyl acrylates, ethylene/alkyl methacrylates, ethylene/vinyl acetates or ethylene/acrylic acid copolymers and their salts (ionomers) and terpolymers of ethylene with propylene and a diene, such as hexadiene, dicyclopentadiene or ethylidene-norbornene.

4.1. Polystyrene or copolymers of styrene or α-methylstyrene with dienes or acrylic derivatives, such as, for example, styrene/butadiene, styrene/acrylonitrile, styrene/alkyl methacrylates, styrene/acrylonitrile/methyl acrylate; mixtures of high impact strength from styrene copolymers and another polymer, such as, for example, from a polyacrylate, a diene polymer or an ethylene/propylene/diene terpolymer; and block copolymers of styrene, such as, for example, styrene/butadiene/styrene, styrene/isoprene/styrene, styrene/ethylene/butylene/styrene or styrene/ethylene/propylene/styrene.

4.2. Graft copolymers of styrene, such as, for example, styrene on polybutadiene, styrene and acrylonitrile on polybutadiene, styrene and alkyl acrylates or methacrylates on polybutadiene, styrene and acrylonitrile on ethylene/propylene/diene terpolymers, styrene and acrylonitrile on polyacrylates or polymethacrylates, styrene and acrylonitrile on acrylate/butadiene copolymers, as well as mixtures thereof with the copolymers listed under 4.1 for instance the copolymer mixtures known as ABS-, MBS-, ASA- or AES-polymers.

5. Polymers which are derived from α,β-unsaturated acids and derivatives thereof, such as polyacrylates and polymethacrylates, polyacrylamides and polyacrylonitrile, and copolymers with other unsaturated monomers, such as, for instance, acrylonitrile/butadiene, acrylonitrile/alkyl acrylate, acrylonitrile/alkoxyalkylacrylate or acrylonitrile/vinyl halide copolymers or acrylonitrile/alkyl methacrylate/butadiene terpolymers.

6. Polymers derived from unsaturated alcohols and amines, or derivatives thereof, such as polyvinyl alcohol, polyvinyl acetate, polyvinyl stearate, polyvinyl benzoate, polyvinyl maleate, polyvinylbutyral, polyallyl phthalate or polyallyl-melamine.

7. Polyacetals, such as polyoxymethylene and those polyoxymethylenes which contain ethylene oxide as a comonomer.

8. Polyamides and copolyamides which are derived from diamines and dicarboxylic acids and/or from aminocarboxylic acids or the corresponding lactams, such as polyamide 4, polyamide 6, polyamide 6/6, polyamide 6/10, polyamide 11, polyamide 12, poly-2,4,4-trimethylhexamethylene terephthalamid or poly-m-phenylene isophthalamide, as well as block polyetheresteramides, which are derived from polyethers with hydroxy end groups, diamines and dicarboxylic acids.

Preferred compositions of the present invention comprise an organic polymers polyolefins, especially polyethylene or polypropylene, and graft copolymers of styrene such as styrene or polybutadiene, styrene and acrylonitrile on polybutadiene or polyacetals such as polyoxymethylene and polyoxymethylene containing ethylene oxide as a comonomer.

The stabilizer or stabilizer mixture can be mixed with the polymer substrate by following known procedures. The mixing can be effectively conducted in various ways. For one thing, the polymer and at least one stabilizer used are dry mixed and then treated in a kneader or a two roll mill or extrusion moulding machine. These can also be added to the polymer in such a form as to dissolve or disperse in solvents which are evaporated afterwards.

Following Examples are designed to explain the present invention specifically, but the present invention will in no way be limited to these Examples.

As the acylated hydroxy acid type compound in the Examples was used a reaction mixture consisting predominantly of the compound (a) of the general formula (I) synthesized by foregoing said procedure and containing (b)-(f) as secondary components.

In the following examples the additives mentioned are designated as follows:
CSL = Calcium stearoyl lactate
Antioxidant I: 2,6-di-tert.-butyl-p-cresol
Antioxidant II: Octadecyl-3-(3,5-di-tert.-butyl-4-hydroxyphenyl)-propionate
Antioxidant III: 1,1,3-Tris-(5-tert.-butyl-4-hydroxy-2-methylphenyl)-butane
Antioxidant IV: Dilauryl-dithiopropionate
Antioxidant V: 1,6-Hexamethylene-bis-3-(3,5-di-tert.-butyl-4-hydroxyphenyl)-propionate.
Antioxidant VI: Pentaerythrithyl-tetrakis-[3-(3,5-di-tert.-butyl-4-hydroxyphenyl)-propionate].

EXAMPLE 1

100 parts of impact polystyrene (a graft copolymer of styrene on polybutadiene, containing 6% polybutadiene and already stabilized with a very small amount, i.e. 0.035 parts, of Antioxidant I) are thoroughly mixed with the following:
 0.2 parts of zinc stearate
 0.07 parts of Antioxidant II or Antioxidant III
 0.15 parts Antioxidant IV
 0.2 parts of a compound of formula I, designated as calcium stearoyl lacetate (CSL) in the form of its mixture, as described above in the introduction to these examples.

The resulting mixtures are passed twice through a single screw extruder of a maximum temperature of 220° C. The granules are compression molded at 185° C. during three minutes to form plaques of 2 mm thickness from which test specimens of 40×40 mm are cut.

The effectiveness of CSL is estimated by aging the specimens in a circulating air oven which results in yellowing. The table I below show that yellowing is considerably inhibited by CSL.

TABLE I

| Formulation | | Yellowness Index (ASTM D 1925) | |
|---|---|---|---|
| | | After 1500 hours at 80° C. | After 120 minutes at 160° C |
| Antioxidant | no CSL | 57 | 59 |
| II | with CSL | 37 | 34 |
| Antioxidant | no CSL | 45 | 41 |
| III | with CSL | 27 | 28 |

EXAMPLE 1a 100 parts of impact polystyrene (a graft copolymer of sttyrene on polybutadiene, containing 3.5% polybutadiene and already stabilized with a very small amount, i.e. 0.005 parts of antioxidant I and containing 0.2% calcium stearate and 0.05% sodium stearate) are thoroughly mixed with the following:

| | |
|---|---|
| Formulation A: | 0.05 parts Antioxidant II |
| Formulation B: | 0.05 parts Antioxidant II + 0.2 parts CSL |
| Formulation C: | 0.1 parts Antioxidant II |
| Formulation D: | 0.1 parts Antioxidant II + 0.2 parts CSL |

The resulting mixtures are passed twice through a single screw extruder at a maximum temperature of 220° C. The granules are compression molded at 185° C. during 3 minutes to form plaques of 2 mm thickness from which test specimens of 40×40 mm are cut.

The effectiveness of CSL is estimated by aging the specimens in a circulating air oven at 80° C. This treatment results in yellowing of the samples. The Table Ia shows that yellowing is considerably inhibited by CSL.

TABLE Ia

| Formulation | Yellowness Index ASTM D 1925 | |
|---|---|---|
| | | After 750 hours |
| A | 5 | 50 |
| B | 5 | 30 |
| C | 6 | 26 |
| D | 5 | 18 |

EXAMPLE 2

From the compression molded plaques of Example 1 another set of test specimens is cut with the dimension 60×60 mm.

The effectiveness of CSL is estimated by aging the specimens in a circulating air oven at 160° C. The aging effects are followed by periodic measurement of the impact strength (with a pendulum), which decreases with increasing aging time. The Table II below show that the loss of impact strength during aging is considerably inhibited by CSL.

TABLE II

| Formulation | Impact strength (kJ.m$^{-2}$) | |
|---|---|---|
| | After 6 hours at 160° C. | After 9 hours at 160° C. |
| Antioxidant III no CSL | 7.8 | 6.3 |
| with CSL | 11.4 | 8.4 |

EXAMPLE 3

100 parts of unstabilized polyoxymethylene (polyformaldehyde) are throughly mixed with 0.3 parts of Antioxidant V and 0.3 parts of the calcium salt mentioned in the table below. The resulting mixtures are kneaded in a Brabender plastograph during 5 minutes at 190° C. and 30 rpm, followed by compression molding at 190° C. during 3 minutes to form plaques of 1 mm thickness.

From the plaques test specimens of the dimensions 45×60 mm are cut.

Polyoxymethylene stabilized in the described manner has a certain tendency to discolor on storage under ambient conditions. The table III below show that this discoloration is less pronounced in the specimen containing CSL compared with the specimen containing calcium stearate.

TABLE III

| Formulation | Yellowness Index (ASTM D 1925) | |
|---|---|---|
| | Initial | After 8 weeks indoor behind window |
| 0.3% Ca-stearate | 2.7 | 11.2 |
| 0.3% CSL | 2.4 | 9.4 |

Similar results had been obtained by substituting Antioxidant V by Antioxidant VI.

EXAMPLES 4 TO 16 AND COMPARATIVE EXAMPLES A TO D

Polypropylene was prepared by adding in such composition proportions of acylated hydroxy acid type compound as indicated in Table IV, one or several Antioxidants (I, IV and VI) with regard to 100 parts of powdered polypropylene, and stability to oxidation of said polypropylene was investigated by comparison by way of changes of melt indices and heat resistant aging tests. Specimens were prepared as follows.

A given amount of stabilizer was added to powdered polypropylene, uniformly mixed and moulded into pellets by means of extruder. The extruder operated at conditions of the maximum temperature of 220° C. and residence time of 5 to 6 minutes. Then, 10 g of the pellets were placed in a test tube 10 mm across and 200 mm long and sealed to heat at the temperature of 270° C. for given hours. Separately, a sheet 0.3 mm thick was made from said pellets by means of hot press. Hot press conditions were set as the temperature of 200° C., preheating time of 5 minutes, pressing time of 30 seconds and cold pressing time of 3 minutes. A strip of paper-like dumbbell 10 mm×50 mm was stamped out of this sheet, placed in a recycling hot air furnace held at 150° C. and left to stand for long hours to measure the time until it became colored and brittle (heat resistant aging test).

A flat plate 1.6 mm thick was made from the pellets under the same conditions and its total light permeability was measured to investigate its transparency by comparison. Table V shows results.

TABLE IV

| Examples | Acylated hydroxy acid type compound ( )indicates % by weight of main component (a) | | Antioxidants | | |
|---|---|---|---|---|---|
| | | | VI | I | IV |
| 4 | Ac acetyl-3-lactate | (54) 0.01 | 0.1 | 0.1 | |
| 5 | Ca 2-hydroxypropanoyl-3-lactate | (76) 0.1 | 0.1 | 0.1 | |
| 6 | Ca isopalmitoyl-2-lactate | (55) 0.1 | 0.1 | 0.1 | |
| 7 | Ca behenoyl-2-lactate | (55) 0.1 | 0.1 | 0.1 | |
| 8 | Ca palmitoyl-1,8-glycolate | (53) 0.1 | 0.1 | 0.1 | |
| 9 | Ca myristoyl-2-mandelate | (52) 0.1 | 0.1 | 0.1 | |
| 10 | Ca lignoceroyl-2-lactate | (57) 0.2 | 0.2 | | |
| 11 | Na stearoyl-1,5-lactate | (61) 0.1 | 0.1 | 0.1 | |
| 12 | Pb palmitoyl-2-lactate | (58) 0.1 | 0.1 | 0.1 | |
| 13 | Al myristoyl-1-lactate | (65) 0.1 | 0.1 | 0.1 | |
| 14 | K lignoceroyl-1,5-lactate | (61) 0.1 | 0.1 | 0.1 | 0.2 |
| 15 | CSL | (63) 0.2 | 0.2 | | |
| 16 | Ca stearoyl-2-mandelate | (54) 0.2 | 0.2 | | |
| A | none | | | | |

TABLE IV-continued

| Examples | Acylated hydroxy acid type compound ( )indicates % by weight of main component (a) | Antioxidants VI | I | IV |
|---|---|---|---|---|
| B | none | | 0.1 | 0.1 |

TABLE V

| | | Melt index | | Heat resistant aging test | | | |
|---|---|---|---|---|---|---|---|
| | | Pellet | | | | | |
| Examples | Powder | At the time of preparation | 1 hour after heating | Time(in h) until it becomes brittle | Change of appearance | Total light permeability (%) | Remarks |
| 4 | 4.6 | 5.0 | 7.4 | 460 | none | 67 | |
| 5 | 4.5 | 5.2 | 7.7 | 500 | none | 66 | |
| 6 | 5.2 | 5.7 | 7.6 | 650 | none | 69 | |
| 7 | 5.0 | 5.4 | 7.0 | 800 | none | 79 | |
| 8 | 4.3 | 5.6 | 7.2 | 650 | none | 67 | |
| 9 | 4.3 | 5.3 | 7.0 | 625 | none | 70 | |
| 10 | 4.6 | 5.1 | 7.0 | 790 | none | 78 | |
| 11 | 5.7 | 6.4 | 7.4 | 600 | weakly colored | 76 | |
| 12 | 5.3 | 5.5 | 8.2 | 530 | weakly colored | 72 | |
| 13 | 5.4 | 5.8 | 9.3 | 650 | none | 66 | |
| 14 | 4.3 | 6.8 | 9.5 | 450 | weakly colored | 79 | |
| 15 | 5.1 | 5.4 | 7.2 | 800 | none | 83 | |
| 16 | 4.8 | 5.3 | 7.9 | 720 | none | 71 | |
| A | 13.9 | 19.1 | * | 5–6 | | | *30 minutes |
| B | 5.8 | 8.9 | 23.5 | 150 | colored | 65 | value 84.2 |

EXAMPLES 17 TO 23 AND COMPARATIVE EXAMPLES E 0.1 Part of Antioxidant VI, 0.1 part of tris-(2,4-di-tertiary butyl-phenyl)phosphite (Antioxidant VII) and 0.1 part of acylated hydroxy acid type compound listed in Table VI or 0.1 part of calcium stearate as control with regard to 100 parts of powdered polypropylene were added and mixed for 5 minutes and the resulting mixture was extrusion moulded into pellets at the melt temperature of 260° C. Pellets obtained were pressed at 260° C. for 6 minutes to form a flat plate 2 mm thick. A strip of paperlike specimen 20 mm×45 mm was cut off from this one.

The respective test pieces were left to stand for 28 days in the distilled water held at 90° C. Their colors after standing were measured to investigate by comparison their stability in hot water. Results were tabulated in Table VI.

EXAMPLES 24 TO 30 AND COMPARATIVE EXAMPLES F TO H

Polyethylene film was prepared by adding stabilizers shown in Table VII to 100 parts of high density polyethylene powder (density 0.95) to conduct heat resistant aging test. Elongation and changes of melt indices were measured on the resulting polyethylene to investigate its stability by comparison. Specimens were prepared as follows.

A given amount of stabilizer was added to powdered polyethylene, uniformly mixed and moulded into pellets by means of extruder. The extruder operated at conditions of the maximum temperature of 165° C. and residence time of 4 to 5 minutes. Film 0.2 mm thick was moulded from the pellets so prepared by hot press (at the temperature of 150° C.).

The respective film specimens were left to stand in an oven held at 100° C. to measure the lowering of elongation due to heat deterioration and changing of melt indices. The lowering of elongation due to heat deterioration is caused by increased crystallinity due to oxidation and as one of those causes it is found that the remaining catalyst exerts influence. Elongation prior to heat deterioration of the respective film specifications was 80 to 95%. Results were tabulated in Table VII.

TABLE VI

| | STABILIZERS ADDED | | | | Color |
|---|---|---|---|---|---|
| | Antioxidants | | Acylated hydroxy acid type compound ( ) indicates % by weight of main | | (YI, ASTM-D-1295) Average value of |
| Examples | VI | VII | component | | 2 measurements |
| 17 | 0.1 | 0.1 | CSL | (54) 0.1 | 8 |
| 18 | 0.1 | 0.1 | Ca lignoceroyl-2-lactate | (57) 0.1 | 7 |
| 19 | 0.1 | 0.1 | Na lauroyl-2-lactate | (61) 0.1 | 17 |
| 20 | 0.1 | 0.1 | Ca palmitoyl-1,8-glycolate | (53) 0.1 | 9 |
| 21 | 0.1 | 0.1 | Ca stearoyl-2-mandelate | (54) 0.1 | 10 |
| 22 | 0.1 | 0.1 | Ca 1,2-hydroxystearoyl-2-lactate | (57) 0.1 | 12 |
| 23 | 0.1 | 0.1 | { Ca palmitoyl-2-lactate  Ba stearoyl-3-lactate } | (57) 0.03  (55) 0.07 | 8 |
| Comparative Example E | 0.1 | 0.1 | none | | 52 |

TABLE VII

| | Stabilizers added | | Heat deterioration of film (elongation lowering rate %) 100° C. × hour | | | Melt index 100° C. × hour | | | |
|---|---|---|---|---|---|---|---|---|---|
| | | | 12 | 24 | 48 | 0 | 12 | 24 | 48 |
| Examples | | | | | | | | | |
| 24 | Antioxidant VI | 0.005 | 8 | 15 | 29 | 9.1 | 8.8 | 8.3 | 8.2 |
| | Ca myristoyl-2-lactate | (58) 0.2 | | | | | | | |
| 25 | Antioxidant VI | 0.005 | 8 | 15 | 28 | 9.0 | 8.7 | 8.2 | 8.0 |
| | Ca hexanoyl-2-lactate | (60) 0.2 | | | | | | | |
| 26 | Antioxidant VI | 0.005 | | | | | | | |
| | Antioxidant I | 0.005 | 6 | 12 | 23 | 9.0 | 8.6 | 8.2 | 7.9 |
| | Ca 2-ethylhexanoyl-3-lactate | (54) 0.2 | | | | | | | |
| 27 | Antioxidant VI | 0.005 | | | | | | | |
| | Antioxidant I | 0.005 | 7 | 14 | 26 | 9.1 | 8.6 | 8.1 | 7.8 |
| | Na stearoyl-1,5-glycolate | (61) 0.2 | | | | | | | |
| 28 | Antioxidant II | 0.005 | 9 | 16 | 30 | 9.1 | 8.8 | 8.3 | 8.2 |
| | Na behenoyl-3-lactate | (57) 0.1 | | | | | | | |
| 29 | Antioxidant II | 0.005 | 9 | 16 | 30 | 8.9 | 8.6 | 8.2 | 8.0 |
| | Ca 2-hydroxypropanoyl-2-lactate | (72) 0.2 | | | | | | | |
| 30 | Antioxidant II | 0.005 | | | | | | | |
| | Antioxidant I | 0.005 | 8 | 14 | 26 | 9.2 | 8.7 | 8.2 | 7.9 |
| | Ca stearoyl-2-mandelate | (52) 0.1 | | | | | | | |
| Comparative Examples | | | | | | | | | |
| F | none | | 36 | 55 | 88 | 8.3 | 7.8 | 7.2 | 6.5 |
| G | Antioxidant VI 0.005 | | 17 | 24 | 41 | 8.4 | 8.1 | 7.8 | 7.2 |
| H | Antioxidant II 0.005 | | 15 | 22 | 38 | 8.4 | 8.2 | 7.9 | 7.4 |
| | Antioxidant I 0.005 | | | | | | | | |

NOTE:
The numeral in ( ) indicates % by weight of the main component compound (a) involved in the mixed stabilizer.

It is assessed from these results that as the effects by joint use of the acylated hydroxy acid type compound and sterically hindered phenolic compound and thermal stabilization effect should be excellent and melt fluidity be enhanced.

I claim:

1. A stabilized composition comprising an organic polymer selected from the group consisting of
polyolefins,
unsaturated elastomers,
polystyrene and graft copolymers thereof,
polymers which are derived from α,β-unsaturated acids,
polymers derived from unsaturated alcohols and amines,
polyacetals, and
polyamides
having incorporated therein calcium stearoyl lactate.

2. A composition according to claim 1 comprising, as an additive, at least one sterically hindered phenolic compound.

3. A composition according to claim 2 comprising 0.05 to 2% by weight of calcium stearoyl lactate and 0.001 to 1% by weight of the sterically hindered phenolic compound with regard to the organic polymer.

4. A composition according to claim 1 wherein the organic polymer is a polyolefin.

5. A composition according to claim 1 wherein the organic polymer is a graft copolymer of styrene.